United States Patent [19]

Gevaud et al.

[11] 4,294,106

[45] Oct. 13, 1981

[54] LEAK DETECTOR

[75] Inventors: Roland Gevaud, Argonay; Jacques Tallon, Annecy, both of France

[73] Assignee: Compagnie Industrielle des Telecommunications Cit-Alcatel, Paris, France

[21] Appl. No.: 131,121

[22] Filed: Mar. 17, 1980

[30] Foreign Application Priority Data

Mar. 28, 1979 [FR] France .............................. 79 07788

[51] Int. Cl.³ .............................................. G01M 3/20
[52] U.S. Cl. .................................................. 73/40.7
[58] Field of Search ...................................... 73/40.7

[56] References Cited

U.S. PATENT DOCUMENTS

| | | | |
|---|---|---|---|
| 2,486,199 | 10/1949 | Nier | 73/40.7 |
| 3,327,521 | 6/1967 | Briggs | 73/40.7 |
| 3,520,176 | 7/1970 | Becker | 73/40.7 |
| 3,592,048 | 7/1971 | Maurice et al. | 73/40.7 |
| 3,616,680 | 11/1971 | Schrader | 73/40.7 |
| 3,626,760 | 12/1971 | Briggs et al. | 73/40.7 |
| 3,645,127 | 2/1972 | Mongodin et al. | 73/40.7 |
| 3,690,151 | 9/1972 | Briggs | 73/40.7 |
| 3,762,212 | 10/1973 | Morley et al. | 73/40.7 |
| 3,867,631 | 2/1975 | Briggs et al. | 250/281 |
| 3,968,675 | 7/1976 | Briggs | 73/1 G |

FOREIGN PATENT DOCUMENTS 1474137 3/1967 France .
1495806 9/1967 France .
2013717 4/1970 France .

*Primary Examiner*—Gerald Goldberg
*Assistant Examiner*—Joseph W. Roskos
*Attorney, Agent, or Firm*—Kenyon & Kenyon

[57] ABSTRACT

A leak detector comprises helium measuring means (6) for measuring helium sucked in by a sniffer (2) via a flexible hose (3) and a liquid nitrogen trap (5). A vacuum is maintained in the nitrogen trap (5) by a molecular diffusion pump (7) leading to a vacuum pump (18) which exhausts to the atmosphere. In order to speed the flow of gas, possibly including helium as a tracer element, along the flexible hose (3) most of the gas sucked in by the sniffer (2) is diverted from the inlet (4) to the nitrogen trap by a bleeder arrangement (12) connected to an auxiliary duct (11) which is itself connected to an intermediate point between two stages in the vacuum pump (18).

5 Claims, 1 Drawing Figure

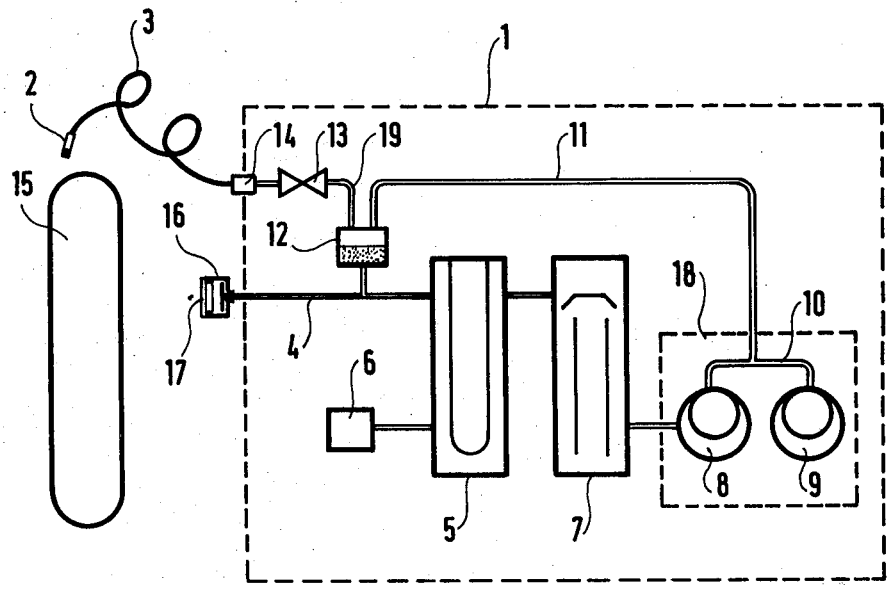

LEAK DETECTOR

The present invention relates to an improved sniffer arrangement for a leak detector of the type that detects helium, particularly by means of a mass spectrometer.

BACKGROUND OF THE INVENTION

The sealing of an enclosure can be tested using helium by inflating the enclosure with helium, by sucking in any helium which may escape via a possible leak using a sniffer, and then sending the flow of gas sucked in by the sniffer to a vacuum analyser which detects the presence of the tracer helium, if any, arriving at the analyser.

If the sniffer is located at a distance of several meters from the analyser, the response of the analyser is inconveniently delayed by a length of time which corresponds to the transit time required for the tracer helium to arrive at the analyser. One solution to this drawback has been to install an auxiliary pump connected in parallel to the sniffer gas circuit in order to move the tracer gas under viscous conditions at a reasonable speed. Such an auxiliary pump is generally installed near to the analyser. Unfortunately this method has the drawback of requiring extra pumping apparatus, for example a membrane pump or a vane pump. This makes the detector more bulky and also requires an auxiliary source of power to drive the auxiliary pump.

SUMMARY OF THE INVENTION

The present invention provides a leak detector of the type that detects helium, the detector comprising a sniffer connected via a flexible hose to an inlet duct which is itself connected via a nitrogen trap and a molecular diffusion pump to a main vacuum pump whose inlet is connected to the molecular diffusion pump and whose outlet exhausts into the atmosphere, the nitrogen trap being further connected to helium measuring means; the improvement comprising:

firstly providing the main vacuum pump in the form of a two stage pump having a low pressure stage connected to pump from the molecular diffusion pump and to exhaust, via a link duct, into a high pressure stage which itself exhausts to the atmosphere and secondly providing a bleeder arrangement connecting the flexible hose both to the inlet duct and to an auxiliary duct which leads to said link duct between the pump stages to pump air and any leaking helium along the flexible hose at a speed greater than that which is attainable when the hose is directly connected only to the inlet duct, the bleeder arrangement ensuring that a proportion of the gas pumped in through the sniffer is fed via the inlet duct and the nitrogen trap to the helium measuring means.

The bleeder arrangement may be constituted by a needle valve or by a porous membrane.

An electrically operated valve may be installed between the sniffer and the bleeder arrangement, and generally it is convenient to provide the valve inside the leak detector. The flexible hose may be removably connected to the leak detector via a suitable coupling.

BRIEF DESCRIPTION OF THE DRAWING

The sole FIGURE is a diagrammatic representation of a leak detector in accordance with the invention.

DETAILED DESCRIPTION

In the figure a helium leak detector comprises an analyser 1 with a sniffer probe 2 connected to the analyser 1 via a flexible hose 3 and a releasable coupling 14. The releasable coupling 14 is connected to an electrically operated valve 13 which leads via an intermediate duct 19 and bleeder arrangement 12 to the normal inlet duct 4 of the leak detector. A normal inlet 16 is directly connected to the inlet duct 4 and is closed by a plug 17 when the sniffer is being used at a distance from the leak detector.

The normal inlet duct 4 leads to a liquid nitrogen trap 5 which is connected both to helium measuring means 6 and to a molecular diffusion pump 7. The outlet of the molecular diffusion pump 7 is connected to a main vacuum pump in the form of a two-stage vane pump 18. The main pump comprises a low pressure first stage 8 connected to the molecular diffusion pump 7 and with its outlet connected via a link duct 10 to the inlet of the second or high pressure stage 9 which exhausts to the atmosphere. The link duct 10 is also connected via an auxiliary duct 11 to the bleeder arrangement 12 on the intermediate duct 19. The bleeder arrangement 12 includes a member such as a needle valve or a porous membrane through which it is connected to the inlet duct 4.

The leak detector operates as follows. After a part 15 to be tested has been inflated with helium, the sniffer 2 is moved over its surface in order to suck in any helium which may be escaping from possible leaks. The helium is picked up by the sniffer 2 together with air and is pumped at high speed under viscous conditions by the high pressure stage 9 of the pump 18. When passing through the bleeder arrangement 12 a small portion of the gas sucked in by the sniffer is diverted towards the liquid nitrogen trap 5 for analysis while the major portion of the mixture is exhausted to the atmosphere via the high pressure stage 9 and the auxiliary duct 11.

The auxiliary duct 11 must be connected to a point where the pressure is intermediate the inlet and outlet pressures of the pump 18 in order to ensure that the pressure in the flexible hose does not drop below about a millibar, since at lower pressures the helium will not move at high speeds. Thus the arrangement described cannot be directly connected to the outlet of the molecular diffusion pump 7. In other words it is necessary to have a a two-stage pump 18 in order for an appropriate intermediate pressure of not less than one millibar to be readily obtainable. The electrically operated valve 13 is intended to close automatically in the event of an electric power failure in order to prevent air entering the diffusion pump once the vane pump 18 stops.

The sniffer 2 is constituted by a capillary tube of stainless steel, or alternatively by a needle valve.

Naturally the invention is not limited to the particular embodiment described.

We claim:

1. A leak detector of the type that detects helium, the detector comprising a sniffer connected via a flexible hose to an inlet duct which is itself connected via a nitrogen trap and a molecular diffusion pump to a main vacuum pump whose inlet is connected to the molecular diffusion pump and whose outlet exhausts into the atmosphere, the nitrogen trap being further connected to helium measuring means; the improvement comprising:

firstly providing the main vacuum pump in the form of a two stage pump having a low pressure stage connected to pump from the molecular diffusion pump and to exhaust, via a link duct, into a high pressure stage which itself exhausts to the atmosphere; and secondly providing a bleeder arrangement connecting the flexible hose both to the inlet duct and to an auxiliary duct which leads to said link duct between the pump stages to pump air and any leaking helium along the flexible hose at a speed greater than that which is attainable when the hose is directly connected only to the inlet duct, the bleeder arrangement ensuring that a proportion of the gas pumped in through the sniffer is fed via the inlet duct and the nitrogen trap to the helium measuring means.

2. A leak detector according to claim 1, wherein the bleeder arrangement comprises a needle valve.

3. A leak detector according to claim 1, wherein the bleeder arrangement comprises a porous membrane.

4. A leak detector according to claim 1, and further including an electrically operated valve located between the bleeder arrangement and the sniffer.

5. A leak detector according to any preceding claim, wherein the the flexible hose is connected to the detector by a releasable coupling.

* * * * *